United States Patent
Lin et al.

(10) Patent No.: US 12,536,294 B2
(45) Date of Patent: Jan. 27, 2026

(54) SECURITY-AWARE DESIGN WITH PLACEMENT FOR POWER/EMAG ASSESSMENT

(71) Applicant: ANSYS, INC., Canonsburg, PA (US)

(72) Inventors: Lang Lin, Cupertino, CA (US); Kayhan Kucukcakar, Los Altos, CA (US); Jimin Wen, Pleasanton, CA (US); Norman Chang, Fremont, CA (US); Preeti Gupta, San Jose, CA (US); Hua Chen, Chengdu (CN)

(73) Assignee: ANSYS, INC., Canonsburg, PA (US)

( * ) Notice: Subject to any disclaimer, the term of this patent is extended or adjusted under 35 U.S.C. 154(b) by 626 days.

(21) Appl. No.: 18/081,573

(22) Filed: Dec. 14, 2022

(65) Prior Publication Data
US 2023/0367885 A1 Nov. 16, 2023

Related U.S. Application Data

(60) Provisional application No. 63/341,648, filed on May 13, 2022.

(51) Int. Cl.
*G06F 30/33* (2020.01)
*G06F 21/57* (2013.01)
(Continued)

(52) U.S. Cl.
CPC ........ *G06F 21/577* (2013.01); *G06F 21/6245* (2013.01); *G06F 30/3308* (2020.01); *G06F 2221/034* (2013.01)

(58) Field of Classification Search
USPC ......... 716/110, 111, 115, 118, 119, 126, 139
See application file for complete search history.

(56) References Cited

U.S. PATENT DOCUMENTS 11,301,608 B2 4/2022 Lin et al.
11,520,960 B1 12/2022 Selvakumaran et al.
(Continued)

OTHER PUBLICATIONS

Andikos, et al., "Location, Location, Location: Revisiting Modeling and Exploitation for Location-Based Side Channel Leakages," International Association for Cryptologic Research, Feb. 2019, 26 pages.
(Continued)

*Primary Examiner* — Brian Ngo
(74) *Attorney, Agent, or Firm* — WOMBLE BOND DICKINSON (US) LLP

(57) ABSTRACT

Techniques for security vulnerability assessment of security-sensitive circuit designs are described. A placement of security-sensitive components of a design may be based on constraints related to how far apart a relevant set of security-sensitive components are allowed without consuming too much power and how to optimize the placement to minimize electromagnetic side-channel leakage or other security vulnerabilities. In one embodiment, a method may receive data that includes a representation of a design of an IC and may identify security-sensitive components of the design from the data. The method may determine a placement for the design based on constraints on a level of security vulnerabilities of the security-sensitive components and may perform a power simulation for the design based on the placement. The method may generate an assessment of the level of security vulnerabilities of the security-sensitive components based on the power simulation to adjust the placement for the design.

22 Claims, 9 Drawing Sheets

(51) Int. Cl.
*G06F 21/62* (2013.01)
*G06F 30/3308* (2020.01)

(56) References Cited

U.S. PATENT DOCUMENTS

| | | |
|---|---|---|
| 2011/0228926 A1 | 9/2011 | Shumow et al. |
| 2016/0140274 A1 | 5/2016 | Wachs et al. |
| 2016/0232105 A1* | 8/2016 | Goss ................ G06F 21/78 |
| 2021/0026994 A1 | 1/2021 | Tehranipoor et al. |
| 2021/0224452 A1* | 7/2021 | Lin .................. G06F 30/33 |
| 2022/0019720 A1 | 1/2022 | Bhunia et al. |
| 2022/0060327 A1 | 2/2022 | Zhu et al. |
| 2023/0006674 A1* | 1/2023 | Bhunia .............. G06F 21/75 |

OTHER PUBLICATIONS

Ametani, et al., "Guideline for Numerical Electromagnetic Analysis Methods: Application to Surge Phenomena and Comparison with Circuit Theory-Based Approach," Cigré, Jun. 2013, 106 pages.

Das, et al., "STELLAR: A Generic EM Side-Channel Attack Protection through Ground-Up Root Cause Analysis," IEEE 2019, 10 pages.

Halak, B., et al., "Power balanced circuits for leakage-power-attacks resilient design," 2015 Science and Information Conference (SAI), 2015, pp. 1178-1183.

Office Action from U.S. Appl. No. 17/201,939 dated Apr. 12, 2022, 6 pages.

Office Action from U.S. Appl. No. 16/948,158 dated Aug. 17, 2021, 6 pages.

Notice of Allowance from U.S. Appl. No. 17/201,939 mailed Aug. 3, 2022, 7 pages.

Notice of Allowance from U.S. Appl. No. 16/948,158 dated Dec. 10, 2021, 5 pages.

\* cited by examiner

SECURITY-AWARE DESIGN WITH PLACEMENT FOR POWER/EMAG ASSESSMENT

CROSS REFERENCE TO RELATED APPLICATIONS

This application claims the benefit of U.S. Provisional Application No. 63/341,648 filed on May 13, 2022, the disclosure of which is incorporated herein by reference in its entirety.

BACKGROUND

Side channel attacks on a device, such as a smart phone or credit card or computer, can non-invasively extract sensitive information, such as cryptographic keys or passwords, from the device. There has been a proliferation of such attacks that exploit unintentional leakage or other security vulnerabilities through "side channel" information which may include information derived from power supply noise (e.g., on a power grid of an integrated circuit (IC)), power consumption, electromagnetic emission, thermal emission, etc. For example, by measuring the dynamic voltage drop or current draw of a device while performing a large number of encryption/decryption operations, the sensitive information of the device can be learned and extracted through statistical correlation analysis. Current methods to detect these leakages or other security vulnerabilities during a design process for a device rely upon hardware techniques that test the device after manufacturing the device, and these tests are performed in laboratories of certified testing services. These tests can be used to cause a redesign of an IC, but only after the IC has been fabricated.

Side channel attacks (SCA) can extract secret data from running ICs (that are using the secret data such as cryptographic keys) by measuring the physical emissions or operating characteristics of security sensitive components such as registers/nets of the secret data or unprotected data memory. The protection of side channel leakage would require a thorough side channel leakage analysis (SCLA) of the targeted chip at multiple locations, including the power noise presented in the entire power supply network, the electromagnetic field radiation near the chip surface, as well as the temperature profile of the chip package system.

SUMMARY OF THE DESCRIPTION

This disclosure describes methods and systems for security vulnerability assessment of security-sensitive circuits represented in various levels of design abstraction including register transfer level (RTL), or gate level, or others. Side-channel attacks against security-sensitive circuits attempt to extract sensitive data such as cryptographic keys or passwords from integrated circuits (ICs) executing cryptographic algorithms by exploiting side-channel leakage of physical emissions or operating characteristics such as power signatures or electromagnetic field radiation generated by security-sensitive components of the ICs. Side-channel vulnerability may be defined as the correlation between the cryptographic algorithm's execution pattern and the attacker's side-channel observation. It is desired to assess side-channel leakage vulnerabilities of a design early in the design cycle such as during the register transfer level (RTL) design stage when the cost associated with implementing corrective measures to remedy the vulnerability is still relatively low. However, it is challenging to assess side-channel leakage or other security vulnerabilities at the RTL design stage, especially electromagnetic side-channel emissions. Described are techniques for assessing security vulnerability of an RTL design containing security-sensitive components by performing a placement of the RTL design and performing a power simulation based on the placement to derive security metrics. The techniques may iteratively adjust the placement based on the security metrics to reduce side-channel leakage or other security vulnerabilities.

A placement at RTL stage may be used for guidance and may be created to make reasonable assumption of cell locations of security-sensitive components. A placement of a design at the RTL stage may place security-sensitive components and non-security-sensitive components of the design into cell locations without going through a full placement and route. A security-aware implementation flow to guide the placement of security-sensitive registers may be based on constraints related to how far apart a relevant set of security-sensitive components are allowed without consuming too much power and how to optimize the placement to minimize electromagnetic (Emag) side-channel leakage vulnerabilities.

A method according to one embodiment can include the following operations: receiving data that includes an RTL representation of a design (e.g., an IC) that includes security-sensitive components; performing security-aware placement of the design in consideration of power/electromagnetic side-channel leakage and total power of the design; performing security vulnerability analysis of the placement to generate security metrics indicating level of power/electromagnetic side-channel leakage of security-sensitive components of the design; determining if the security metrics satisfy a set of security criteria; if the security metrics do not satisfy the security criteria, determining adjustments to the placement of the security-sensitive components likely to improve the security metrics and adjusting the security-aware placement under the constraints of power/electromagnetic side-channel leakage and total power of the design to improve the security metrics until the security criteria are satisfied; otherwise, if the security metrics satisfy the security criteria, generating a physical design for the IC based on the security-aware placement.

In one embodiment, the operation to perform security-aware placement of a design in consideration of power/electromagnetic side-channel leakage and total power of the design may include: receiving input data that contains an RTL representation of a circuit; identifying security-sensitive components such as registers grouped or clustered into bytes or other units that store security related data of the circuit from the RTL representation; receiving placement constraints for the clustered group of security-sensitive components, the placement constraints being used to limit power side-channel leakage and circuit-level electromagnetic side-channel leakage of fixed partitions of placement floorplan; and performing placement of the design to scatter security-sensitive components of each clustered group bound by the placement constraints.

In one embodiment, the operation to perform security-aware placement of a design in consideration of power/electromagnetic side-channel leakage and total power of the design may include: receiving placement constraints for the security-sensitive components of the design separated into clustered groups. The placement constraints specify a range of mutual distance between security-sensitive component within a same clustered group and a minimum width and a minimum pitch routing constraints on power and ground metal layers; performing placement of the RTL representation of the design to scatter security-sensitive components of each clustered group bound by the placement constraints; and partitioning the placement of the design into multiple partitions such as tiles to perform simplified power and ground routing based on the constraints for the power and ground metal layers.

In one embodiment, the operation to perform security vulnerability analysis of the placement to generate security metrics indicating level of power/electromagnetic side-channel leakage of security-sensitive components of a design implemented on an IC may include: performing time-based power simulation of the RTL representation of the design based on the placement; generating time-based power consumption for each tile with virtual probes, estimating electromagnetic emissions for the IC at an observation point, and estimating total power consumption for the design; determining if the total power consumption satisfies a maximum power constraint; if the total power consumption does not satisfy the maximum power constraint, determining adjustments to the placement of the security-sensitive components likely to reduce the total power consumption and adjusting the placement of the design to redistribute security-sensitive components of each clustered group bound by the placement constraints until the total power consumption from the time-based power simulation satisfies the maximum power constraint.

In one embodiment, the operation to perform security vulnerability analysis of the placement to generate security metrics indicating level of power/electromagnetic side-channel leakage of security-sensitive components of a design implemented on an IC may include: calculating security metrics such as T-score or simulation measurement-to-disclosure (SMTD) of an RTL representation of a design containing security-sensitive components based on tile-based dynamic power consumption or chip-based electromagnetic emission derived from a placement of the RTL representation.

In one embodiment, the operation to determine if the security metrics satisfy a set of security criteria may include: receiving security criteria such as a maximum T-score or a minimum SMTD identifying tile-level power side-channel leakage or chip-level electromagnetic side-channel leakage constraints; determining if the security metrics such as the T-score or the SMTD calculated from the security vulnerability analysis of the placement satisfy the security criteria; if the calculated security metrics do not satisfy the security criteria, adjusting the placement of the security-sensitive components bound by placement constraints to generate updated tile-based dynamic power consumption or chip-based electromagnetic emission to improve the security metrics until the security metrics satisfy the security criteria.

In one embodiment, a method according to one embodiment can include the following operations: receiving input data that includes a representation of a design of an IC; identifying security-sensitive components of the design from the input data; determining a placement for the design in consideration of constraints on a level of security vulnerabilities of the security-sensitive components; performing a power simulation for the design based on the placement; and generating an assessment of the level of security vulnerabilities of the security-sensitive components based on the power simulation to adjust the placement for the design.

The use of one or more of these methods at the RTL design level or other levels of design abstraction can provide information about the security metrics at an early stage of the design before a full-blown design is completed. For example, this information at an early stage can be used to decide whether to redesign portions of the design before the gate level design process is initiated.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
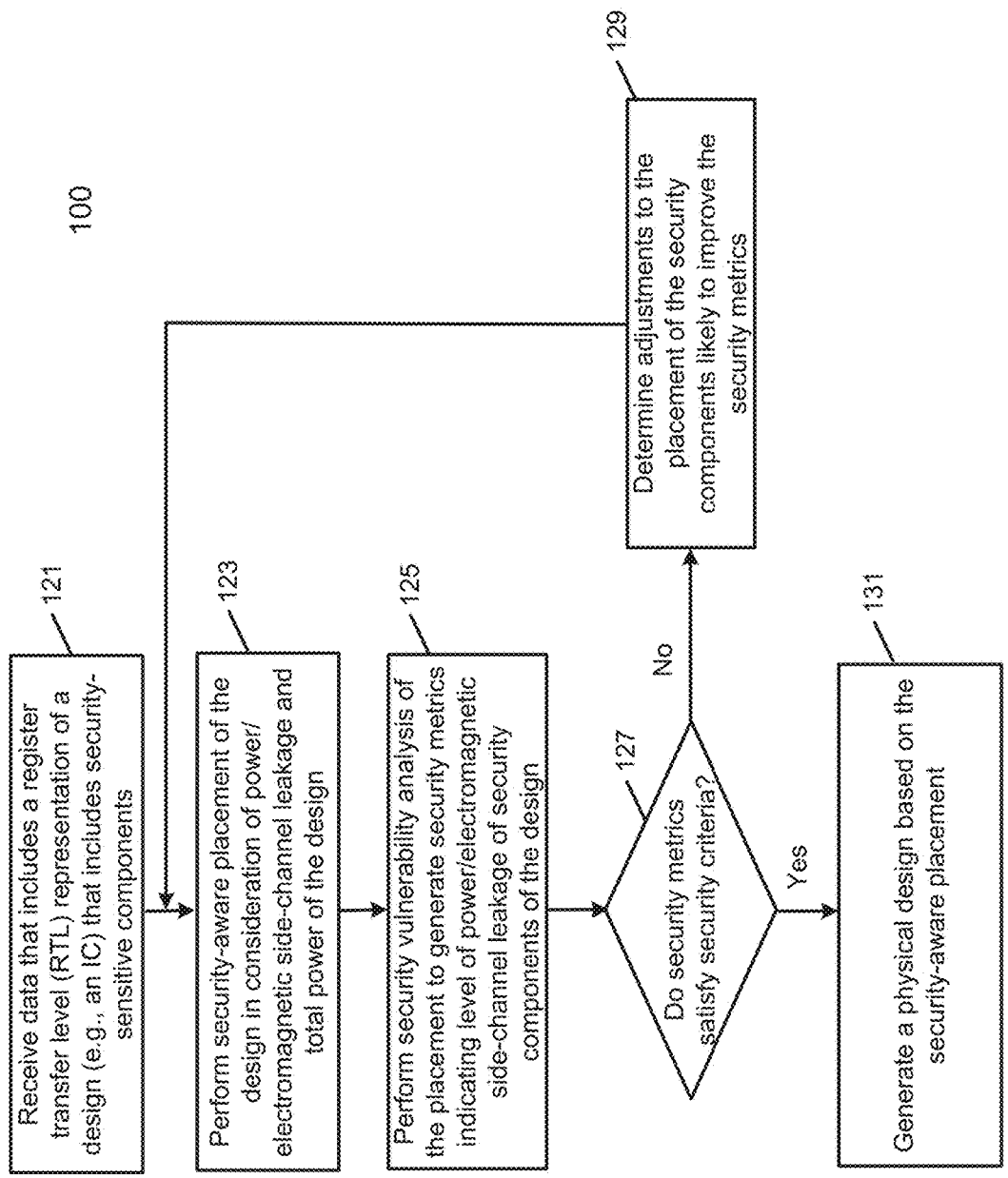
FIG. 1 is a flowchart that shows a method for assessing security vulnerability of an RTL design containing security-sensitive components by performing a placement of the RTL design and performing a power simulation based on the placement to derive security metrics according to one embodiment described herein.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Security vulnerability assessment such as side-channel analysis attempts to extract data value from the power signature, electromagnetic emission, temperature profile, or other operating characteristics of the integrated circuits carrying sensitive data. It typically measures a large number of traces, in the format of either the global time-variant power consumption or the very local time-variant electromagnetic emission or thermal emission. Side-channel analysis may involve simulating power consumption of a design that has gone through implementation phases such as elaboration, synthesis, technology mapping, timing optimization, floorplanning, placement and routing. At early design stage such as with an RTL design without physical placement/routing information, simulating side-channel traces may result in unrealistic data leakage prediction. For example, at the very early stage of a design without actual placement and routing data, RTL power analysis may have too many assumptions to enable accurate power estimation. Therefore, it is very challenging to verify side-channel leakage at the early RTL design stage, especially electromagnetic side-channel.

To overcome security-aware design challenges at the early design stage, a security-aware placement at the RTL stage of a design may be used for guidance to make reasonable assumption of cell locations of security-sensitive components. The placement may be bound by constraints limiting how far apart a relevant set of the security-sensitive components (e.g., security-sensitive registers belonging to the same cryptographic key byte grouping or other clustered groups) may be placed with respect to each other to reduce power and electromagnetic side-channel leakage without consuming too much power. The disclosed techniques may assess the RTL-level electromagnetic and power side-channel vulnerabilities in the form of T-score and/or SMTD (e.g., 1M traces of all key bytes) of an RTL design with distance constraints for the security-sensitive components in the same group for each key byte, total power constraint, and minimum_width/mininum_spacing power/ground (P/G) routing constraints with a representative two top X/Y P/G routing layers.

The disclosed techniques may partition the placement of the design into multiple partitions (e.g., tiles) to perform simplified P/G routing based on the P/G routing constraints. The techniques may perform time-based power simulation of the RTL design based on the placement and the simplified P/G routing to estimate the power consumption for each tile. The per-tile power may be transformed into current through $P=I*V$ with a K % estimated IR-drop, where I represents the current flowing into a tile, V represents the voltage supplied to the tile, and R represents an estimated resistance of the tile. The disclosed techniques may then distribute the current into the composed P/G layers uniformly for a given tile to estimate a chip-level near-field electromagnetic emission at an observation location. The disclosed techniques may minimize the electromagnetic/power side-channel leakage while minimizing the total power of the security design through Bayesian Optimization or other similar placement optimization algorithms such as simulated annealing.

The embodiments described herein improve upon existing methodologies for analyzing side-channel vulnerabilities of designs containing sensitive data (such as cryptographic keys) early in the design stage while simplifying the design flow by clustering security-sensitive components into clustered groups and performing placement of each clustered group of security-sensitive components. The embodiments improve the operations of a data processing system (e.g., a computer) performing the security-aware placement optimization, power simulations and security vulnerability analysis, thereby allowing a designer of a security-sensitive circuit to produce a design that reduces side-channel leakage more quickly and efficiently.

FIG. 1 is a flowchart that shows a method 100 for assessing security vulnerability of an RTL design containing security-sensitive components by performing a placement of the RTL design and performing a power simulation based on the placement to derive security metrics according to one embodiment described herein.

In operation 121, a simulation system such as a computer-aided-design (CAD) tool may receive input data that includes an RTL description of a design containing security-sensitive components or a design that can be used to create an RTL description. For example, the input data can include one or more RTL Verilog files that describe and represent one or more electrical circuits such as one or more integrated circuits (ICs). In other embodiments, the design may be represented in other levels of circuit abstraction such as a gate level netlist. The input data can also include other data that is used in one or more embodiments of the methods described herein to assess side-channel vulnerabilities of the design; this other data can include, for example, a list of secret assets that identify which input values are security-sensitive components (such as secret keys used in encryption algorithms, etc.), conventional library files with power characterization data for target technology that is used for the circuit elements in the design, a conventional simulation activity file (e.g., file formats such as but not limited to FSDB and VCD) that describes switching activity of nodes in the design during operation of the design, etc. It will be understood that the security-sensitive components can be in various different forms or types, including, for example, passwords, account numbers, account names, hashes, keys of various different types (encryption/description keys, file keys, device keys), device identifiers, etc.

In operation 123, the CAD tool may perform security-aware placement of the design in consideration of power/electromagnetic side-channel leakage and total power constraints of the design. The operation may place security-sensitive components as well as non-security-sensitive components of the RTL representation of the design into cell locations of a layout of the IC. In one embodiment, operation 123 may identify from the RTL description clustered groupings of security-sensitive components (e.g., security-sensitive registers), such as the 16 bytes of the AES-128 key. Placement constraints specifying an upper and a lower bound for mutual distances between security-sensitive components within a clustered group may constrain the security-aware placement algorithm when it tries to move apart the security-sensitive components to reduce or minimize per-tile side-channel leakage and full-chip electromagnetic side-channel leakage. The CAD tool may partition the placement of the design into multiple tiles to perform simplified power and ground routing for each tile. In one embodiment, the partitioned tiles may be of a fixed size. The security-sensitive registers of a group may be distributed among one or more partitioned tiles.

In operation 125, the CAD tool may perform a security vulnerability analysis of the placement to generate security metrics indicating level of power and electromagnetic side-channel leakage of the design. In one embodiment, the operation may perform time-based power simulation of each partitioned tile with a virtual probe per each tile, and electromagnetic emission simulation of the full IC at an observation location using, for example, a simulation activity file received as part of the input data. The activity file can be used to specify how the inputs switch in time to achieve a realistic simulation of the operation of the circuit executing the security portion of the design.

The time-based power consumption values for each tile and the electromagnetic emission values for the IC obtained from the power simulation may be used to calculate security metrics for the tiles and the IC. These security metrics measure potential leakage of sensitive data such as the AES-128 key during the operation of the design. The security metrics may include, for example, correlation coefficient data (see, for example, FIG. 6), KL divergence data, T-score, SMTD, etc. For example, the T-score may reflect the side-channel signal variation based on either the tile-based power consumption values or the chip-based electromagnetic emission values. The SMTD may reflect the number of side-channel simulation traces needed to disclose the sensitive data based on correlation analysis of the tile-based power consumption values or the chip-based electromagnetic emission values. In some embodiments, these security metrics can include normalized power values and normalized power variation values of the tiles.

In operation 127, the CAD tool may determine if the calculated security metrics satisfy security criteria. In one embodiment, the security criteria may include a maximum T-score or a minimum SMTD (e.g., 1 million). If the security metrics do not satisfy the security criteria, in operation 129, the CAD tool may choose to adjust the placement of the security-sensitive components within a clustered group, for example, by moving further apart the security-sensitive components limited by the placement constraints while keeping the placement of non-security-sensitive components fixed. Operations 123 may invoke the security-aware placement algorithm to adjust the placement of the security-sensitive components and operation 125 may update the tile-based power consumption values and the chip-based electromagnetic emission values to recalculate the security metrics for the tiles and the IC based on the adjusted placement. The placement adjustment, power and electromagnetic emission simulation, and the security metrics calculation may be iteratively performed until the security metrics satisfy the security criteria. In that case, operation 131 may perform a full placement and route to generate the physical files for the design guided by the security-aware placement.

Figure 2:
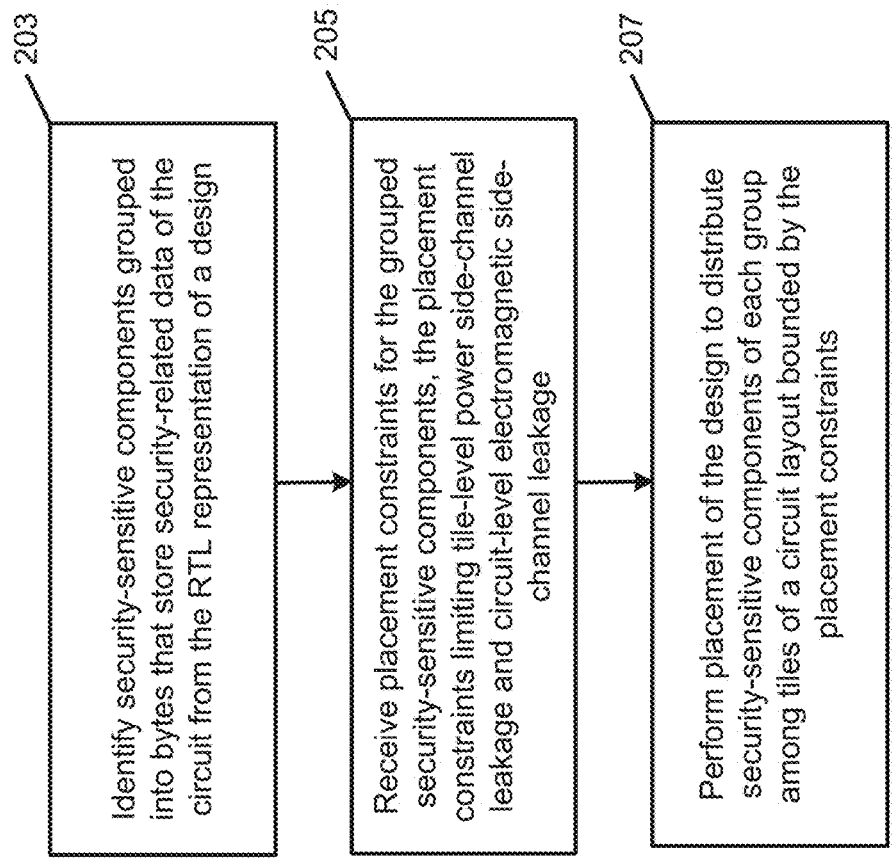
FIG. 2 is a flowchart that shows a method for performing security-aware placement of a design in consideration of power/electromagnetic side-channel leakage and total power of the design according to one embodiment.

FIG. 2 is a flowchart that shows a method 200 for performing security-aware placement of a design in consideration of power/electromagnetic side-channel leakage and total power of the design according to one embodiment. Method 200 presents a more detailed explanation of operation 123 of FIG. 1.

In operation 203, a simulation system upon receiving the RTL representation of a design that includes security components may parse the RTL representation to identify security-sensitive components. In one embodiment, the simulation system may receive a list of secret assets that identify which modules (e.g., cryptographic processing units or secure enclave processors) contain security related data of the design and the simulation system may parse the RTL representation to identify security-sensitive components within those modules. This parsing is, in effect, an information path tracing in which information (such as subkey bits of a cryptographic key) is traced through the paths based upon connections between components specified in the RTL representation. The security-sensitive components may be grouped into clusters, such as grouping the AES-128 key into 16 bytes.

In operation 205, the simulation system may receive placement constraints to guide the placement of the security-sensitive components to reduce power and electromagnetic side-channel leakage. It is desirable to increase the mutual distance between the components in the same security-sensitive clustered group as much as possible to minimize the power and electromagnetic side-channel leakage. By spreading apart the security-sensitive components to make the power variation from executing security operation less localized, it becomes more difficult for side-channel attacks to extract sensitive data from the power signatures or the electromagnetic emission signature of the integrated circuit. However, moving apart the components in the same security-sensitive clustered group has the adverse effect of increasing power consumption due to increased capacitive and resistive loading attributed to longer distance between the components. The placement constraint may strike a balance between the two competing considerations by specifying a distance constraint between the components in the same security-sensitive clustered group and a maximum power constraint for the design (e.g., whole chip). In one embodiment, the distance constraint may specify a range, such as a minimum distance of 2 µm and a maximum distance of 10 µm, between the components in the same security-sensitive clustered group. In one embodiment, the placement constraint may specify a minimum width and a minimum spacing for the routing of a representative two-layer power and ground metal layers running in the vertical and horizontal directions.

In operation 207, the simulation system may perform security-aware placement of the design including placing both security-sensitive components and non-security-sensitive components guided by the placement constraint for the security-sensitive components. For example, the simulation system may scatter the components in the same security-sensitive clustered group guided by the mutual distance constraint to minimize the power and electromagnetic side-channel leakage while keeping the total power consumption for the chip as low as possible. The circuit floorplan of the placement may be physically partitioned into tiles of a fixed size each containing cell locations for logic gates and storage elements into which the security-sensitive components are placed. The partitioned tiles allow simplified power and ground routing for power simulation. The components in the same security-sensitive clustered group may be scattered among one or more partitioned tiles.

Figure 3:
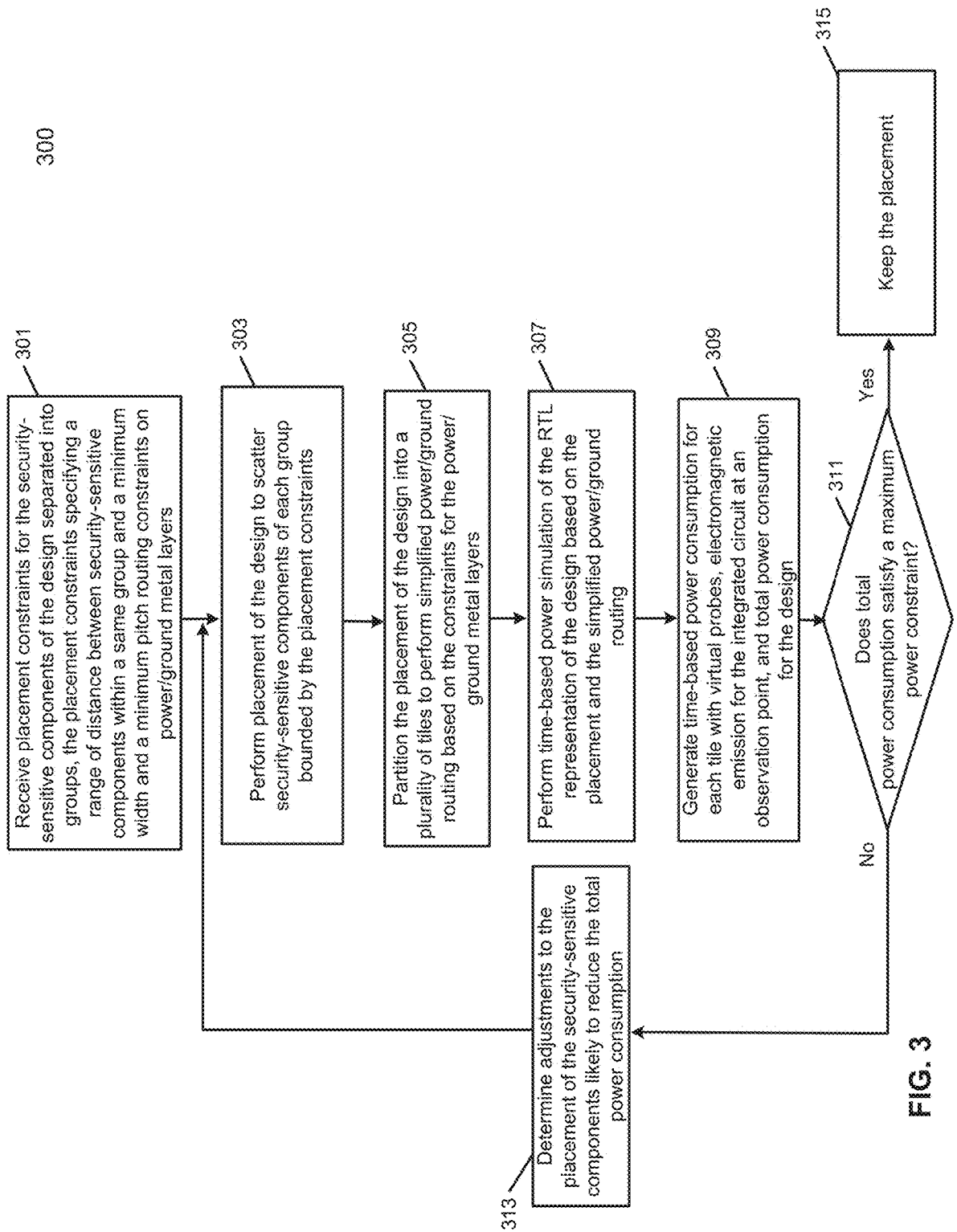
FIG. 3 is a flowchart that shows a more detailed method for performing security-aware placement of a design in consideration of power/electromagnetic side-channel leakage and total power of the design according to one embodiment.

FIG. 3 is a flowchart that shows a more detailed method 300 for performing security-aware placement of a design in consideration of power/electromagnetic side-channel leakage and total power of the design according to one embodiment. Method 300 presents a more detailed explanation of operation 123 of FIG. 1 to generate a placement that satisfies the total power constraint of the design.

In operation 301, a simulation system may receive placement constraints to guide the placement of the security-sensitive components of each clustered group to reduce power and electromagnetic side-channel leakage. The placement constraints may specify a range of mutual distances between components in the same security-sensitive clustered group (e.g., [2 µm-10 µm]), a minimum width and a minimum spacing for performing routing of power and ground metal layers in the tiles, and a maximum power constraint for the design (e.g., whole chip). In one embodiment, the placement constraints may also specify the security criteria to satisfy for the power and electromagnetic side-channel leakage, such as the minimum number of side-channel simulation traces before sensitive data is revealed based on correlation analysis of the power and electromagnetic side-channel leakage (e.g., minimum SMTD=1 million) or the maximum T-score to limit variations in the side-channel leakage signals.

In operation 303, the simulation system may perform placement of the design to scatter security-sensitive components of each clustered group bound by the placement constraints. In one embodiment, the simulation system may perform elaboration, synthesis, and technology mapping of the RTL representation of the design into a netlist so that the security-sensitive registers in RTL are mapped to technology-specific registers. An auto-generated global floorplan with initial placement of high level modules of the design or a global floorplan with detailed cell placement may be imported into the simulation system to provide a starting point for the placement. The simulation system may adjust the placement by moving the components in the same security-sensitive clustered group as far as possible but limited by the maximum mutual distance between the components specified in the placement constraints without exceeding the maximum power constraint also specified in the placement constraints. The simulation system may perform the placement of security-sensitive registers and logic associated with the registers in the clustered groups of security-sensitive components group-by-group. In one embodiment, after all the security-sensitive components of the design have been placed, the simulation system may place the non-security-sensitive components.

In operation 305, the simulation system may partition the placement of the design into tiles of a fixed size (e.g., 50 µm×50 µm). A full-chip floorplan of design may then be partitioned into a grid of tiles in the X and Y directions. The components in the same security-sensitive clustered group may be distributed among multiple tiles to reduce localization of side-channel power signatures and electromagnetic emissions. On top of each tile, the simulation system may perform simplified routing (also referred to virtual routing) of a representative two-layer grid of power and ground metal layers running in the X and Y directions. The virtual routing of power and ground layers for each tile may be used for simulating electromagnetic side-channel emissions at the chip-level.

In operation 307, the simulation system may perform time-based or dynamic power simulation of the RTL representation of the design based on the placement and the virtual power and ground routing for the tiles. In one embodiment, the dynamic power simulation may use activity files (e.g., FSDB and VCD) that specify switching or toggling sequence of input nodes in the security-sensitive components (e.g., security-sensitive registers). The activity files may include a minimum set of vectors to iterate all possible combinations of signal states for the security-sensitive components of the design. For example, the security-sensitive components may use the activity files to perform a sequence of cryptographic operations using known inputs, such as the correct cryptographic key. In one embodiment, the non-security-sensitive components may use random switching or toggling sequence to model dynamic power of the non-security-sensitive components when the design executes security operations.

In operation 309, the simulation system may generate time-based power consumption for each tile, chip-level electromagnetic emission at an observation point, and the total power consumption for the design based on the power simulation. To generate the power consumption for a tile, cells in the tile may get the estimated static power from a pre-characterized cell power library. The static power from all the cells in the tile may be summed to obtain the static tile power. From the switching activities of the cells triggered by the simulation vectors, the dynamic power from all the cells in the tile may be summed to obtain the dynamic tile power. The simulation system may sum the static tile power and the dynamic tile power to obtain the power consumption for each tile. Virtual probes may be inserted into selected positions in the tiles for use in measuring security metrics that may indicate power side-channel leakage for the tiles. The simulation system may sum the power consumption for all the tiles to generate the total power consumption for the design (e.g., whole chip).

To generate chip-level electromagnetic emission, the simulation system may transform the power consumption for each tile into current through P=I*V with a K % estimated IR-drop, where I represents the current flowing into the tile, V represents the voltage supplied to the tile, and R represents an estimated resistance of the tile. The simulation system may then distribute the current into the composed power and ground layers uniformly for the given tile. The current flowing in the two-layer power and ground metals on top of each tile from the virtual routing is modeled as an electrical dipole. Each dipole generates a near-field electromagnetic emission, and full-chip electromagnetic emission at an observation point may be derived by integrating the emissions from the dipoles of all the tiles.

In operation 311, the simulation system may determine if the total power consumption for the design from the placement satisfies a maximum power constraint for the design. For example, if the security-sensitive components within a clustered group are placed too far apart, the per-tile power consumption may increase due to increased capacitive and resistive loading attributed to longer distance between the tiles. The total power consumption for the chip may exceed the maximum power constraint for the design when the mutual distances between security-sensitive components for a clustered group are too long for multiple of such clustered groups. In that case, in operation 313, the simulation system may determine adjustments to the placement of the security-sensitive components likely to reduce the total power consumption, such as by moving the security-sensitive components within a clustered group closer together. In operation 303, the simulation system may adjust the placement of such security-sensitive components. The simulation system may iteratively adjust the placement of the security-sensitive components in operation 303, partition the updated placement into tiles in operation 305, perform power simulation based on the updated placement in operation 307, and estimate the per-tile power consumption in operation 309 until the total power consumption for the design stays below the maximum power constraint. In that case, in operation 315, the system simulation may keep the placement for evaluating the security metrics as will be explained. In some embodiments, the simulation system may perform the optimization of the placement of the security-sensitive registers through simulated annealing or Bayesian optimization techniques.

Figure 4:
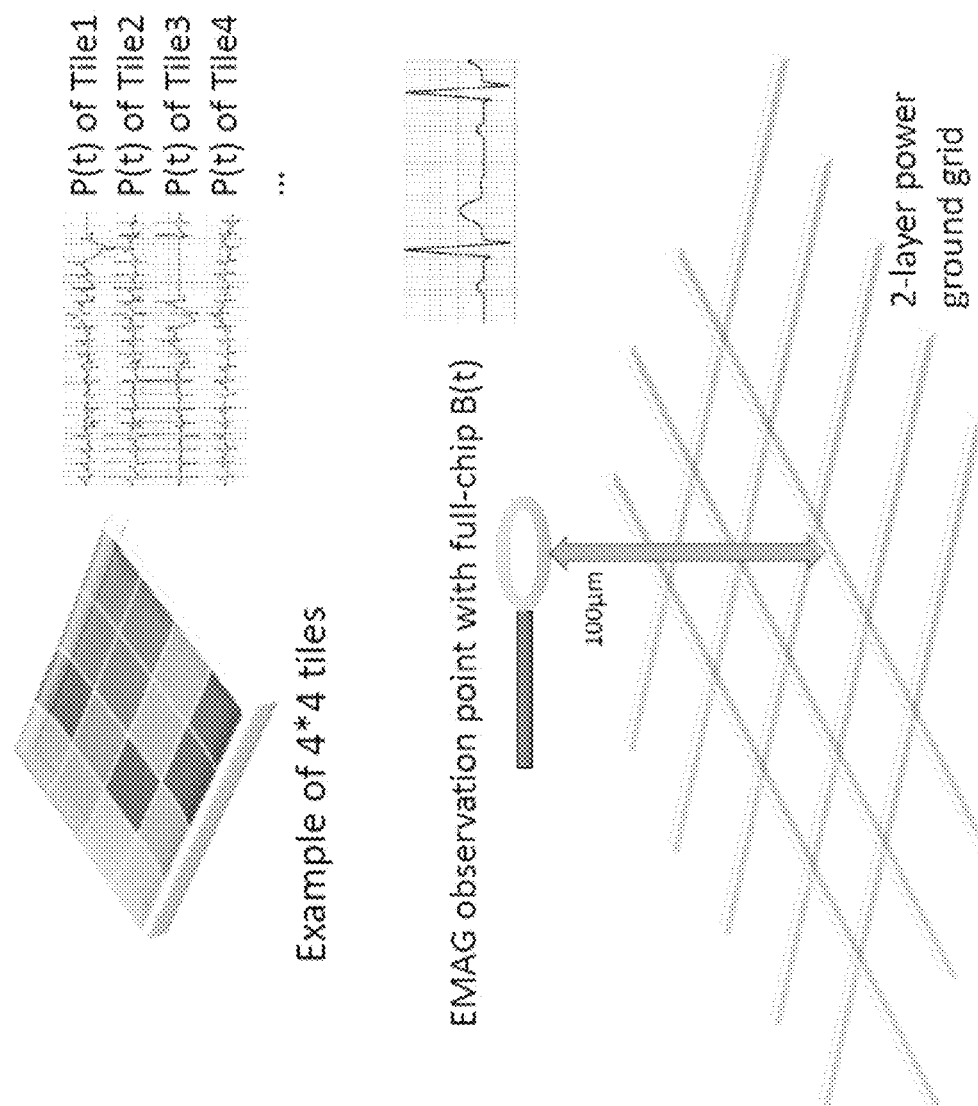
FIG. 4 illustrates time-based power consumption of partitioned tiles and full-chip electromagnetic radiation from power simulation based on the placement of an RTL design to indicate the level of power/electromagnetic side-channel leakage according to one embodiment.

FIG. 4 illustrates time-based power consumption of partitioned tiles and full-chip electromagnetic radiation from power simulation based on the placement of an RTL design to indicate the level of power/electromagnetic side-channel leakage according to one embodiment. The per-tile time-based power consumption of four tiles of an example 4×4 partitioned tiles of the placement may indicate the power side-channel leakage from those 4 tiles. The full-chip time-based electromagnetic radiation at an observation point 100 μm above the 2-layer power and ground grid of a tile may indicate the electromagnetic side-channel leakage measured at the observation point.

Figure 5:
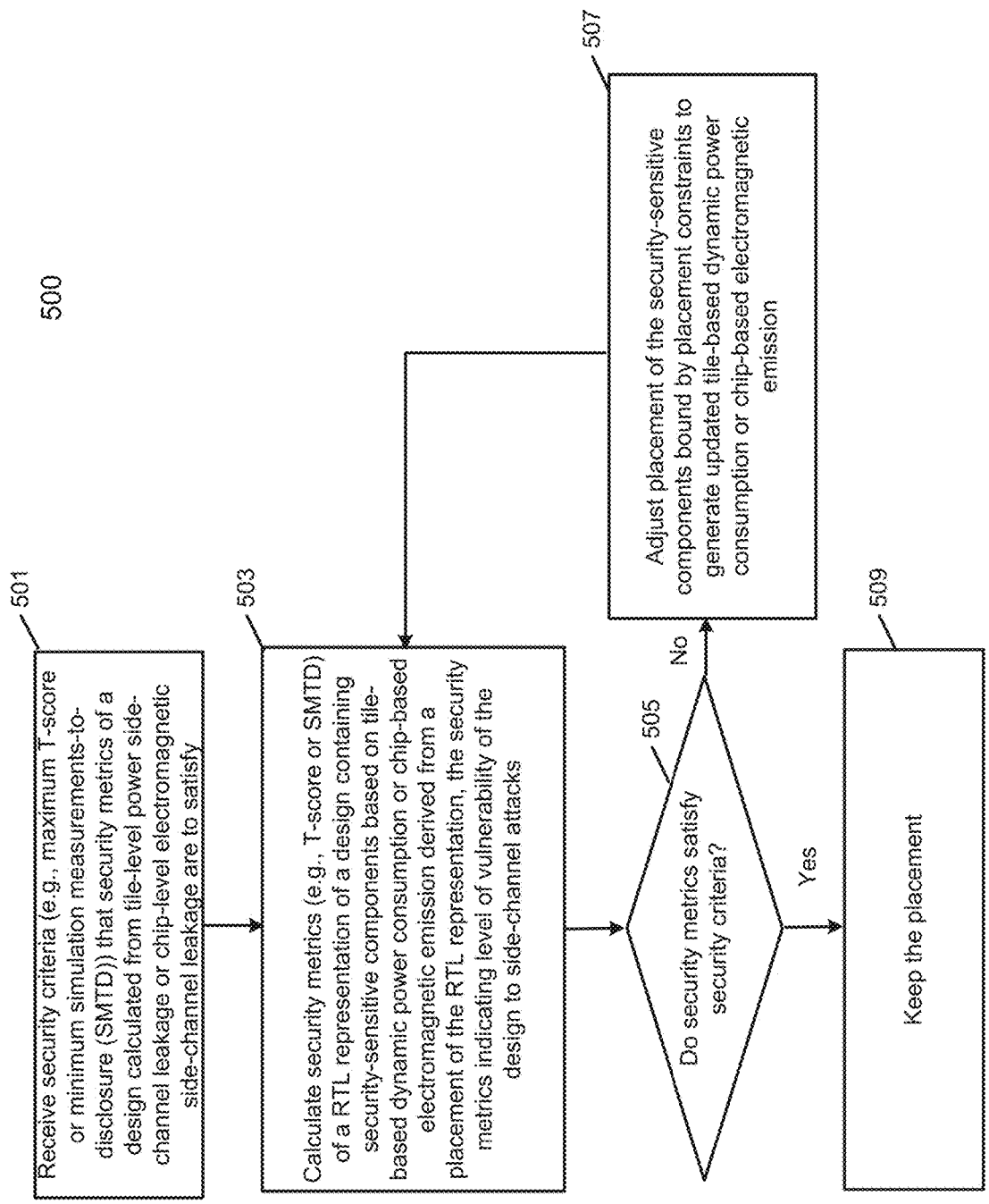
FIG. 5 is a flowchart that shows a method for performing security vulnerability analysis of the placement to generate security metrics indicating the level of vulnerability to side-channel attacks due to power/electromagnetic side-channel leakage of security components of a design according to one embodiment.

FIG. 5 is a flowchart that shows a method 500 for performing security vulnerability analysis of the placement to generate security metrics indicating the level of vulnerability to side-channel attacks due to power/electromagnetic side-channel leakage of security components of a design according to one embodiment. Method 500 presents a more detailed explanation of operation 125 of FIG. 1.

In operation 501, the simulation system may receive security criteria (e.g., maximum T-score or minimum SMTD) that the security metrics of the design calculated from the tile-level power side-channel leakage or the chip-level electromagnetic side-channel leakage are to satisfy. In one embodiment, the security criteria may be specified in the placement constraints of operation 205 of FIG. 2 or operation 301 of FIG. 3.

In operation 503, the simulation system may calculate security metrics (e.g., T-score or SMTD) of the RTL representation of a design containing security-sensitive components based on tile-based dynamic power consumption or chip-based electromagnetic emission from power simulation of a placement of the RTL representation, such as those obtained from operation 309 of FIG. 3. The security metrics may be calculated based on a virtual probe placed on a selected position of each tile. The security metrics may indicate the level of vulnerability of the design to side-channel attacks. For example, the T-score may reflect the side-channel signal variation based on either the tile-based power consumption values or the chip-based electromagnetic emission values. The SMTD may reflect the number of side-channel simulation traces needed to disclose sensitive data based on correlation analysis of the tile-based power consumption values or the chip-based electromagnetic emission values. It is desirable to keep the T-score low to limit variations in the side-channel leakage signals and conversely to keep the SMTD high to make it difficult to extract sensitive data by performing correlation analysis of the side-channel leakage signals.

In operation 505, the simulation system may determine if the security metrics satisfy the security criteria. In one embodiment, the simulation system may determine if the calculated T-score is below the maximum T-score specified by the security criteria. In one embodiment, the simulation system may determine if the calculated SMTD is higher than the minimum SMTD specified by the security criteria. If the security metrics fail to satisfy the security criteria, in operation 507, the simulation system may adjust placement of the security-sensitive components bound by placement constraints to generate updated tile-based dynamic power consumption or chip-based electromagnetic emission. In one embodiment, operations 303, 305, 307, and 309 of FIG. 3 may be invoked to implement operation 507. The simulation system may iteratively adjust the placement of the security-sensitive components (e.g., operation 303), partition the updated placement into tiles (e.g., operation 305), perform power simulation based on the updated placement (e.g., operation 307), estimate the per-tile power consumption and chip-level electromagnetic emission (e.g., operation 309), and calculate the security metrics based on the per-tile power consumption and chip-level electromagnetic emission until the security metrics satisfy the security criteria. In that case, in operation 509, the simulation system may keep the placement to guide a full placement and route to generate the physical files for the design.

Figure 6:
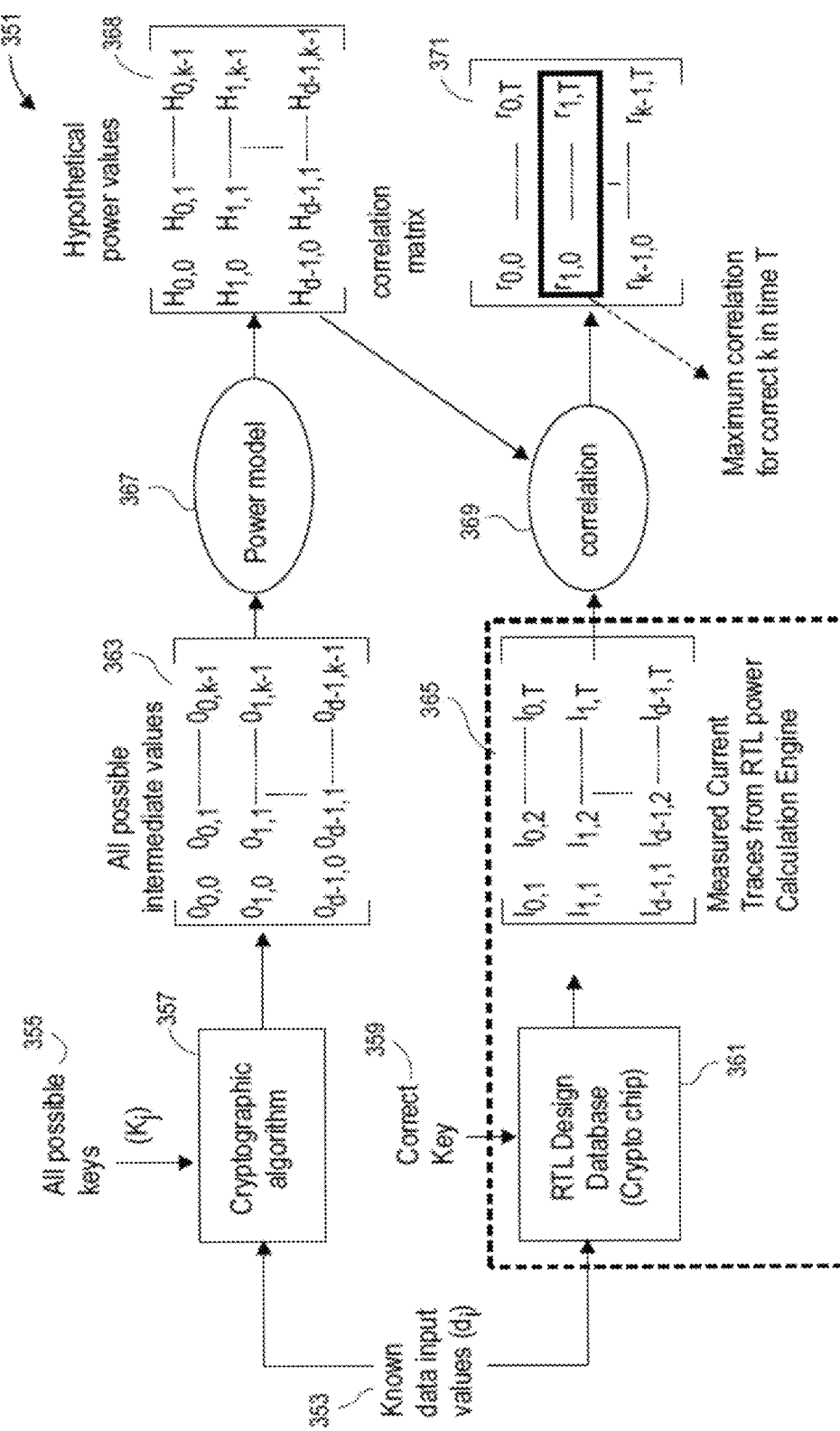
FIG. 6 shows an example of a side channel correlation power analysis that may be used to generate security metrics according to one embodiment.

FIG. 6 shows an example of a side-channel correlation power analysis performed by the simulation system (e.g., a side-channel correlation power analytics engine 351) to generate security metrics according to one embodiment. This flow can receive known data input values 353 which are known to be used in a particular cryptographic algorithm that is used in the design; for example, these known data input values can include constant values and other values used in the cryptographic algorithm. These known input data values are applied to the cryptographic algorithm 357 using all possible keys 355 to create a set of all possible intermediate values 363. These known input data values are also applied to the RTL design 361 during the power simulation (e.g., in operation 307 of FIG. 3). The RTL design 361 also receives the correct key 359 in that simulation.

The result of the simulation is a set of measured (from the simulation) dynamic power 365 over a set of cycles in time, given the sequence of cryptographic operations, and this set of measured dynamic power 365 is compared in a correlation operation 369 to the hypothetical power values 368 that are derived from the power model 367. The power model 367 can, in one embodiment, be a Hamming Distance or Hamming weight of the outputs in the set of all possible intermediate values 363. The result of the correlation operation 369 can be a matrix 371 of correlation values, which can reveal the maximum correlation for the guessed key. The absolute maximum value along a row of the matrix 371 is the guessed key. Assuming there are 100 blocks which carry the security sensitive registers, the flow in FIG. 6 will produce 100 correlation coefficients with block annotations. Note that any security metrics such as t-test, correlation of block power to global power, power variations, etc. can also be used in place of correlation coefficient.

A metric referred to as a side channel leakage score (SLS) can be defined as the ratio of (a) the correlation coefficient of the correct key to (b) the maximum correlation coefficient of the guessed key among all possible key values. In particular, SLS=(correlation coefficient of correct key)/ (maximum correlation coefficient of guessed key). If the SLS value is 1 or nearly 1, then the correct key for the given probe is revealed with fewer number of traces, which means the design is highly leaky. If the SLS is close to zero (0), then the probes are not leaky for the given number of traces. Side channel vulnerability can be defined as the correlation between the cryptographic algorithm's execution pattern and the attacker's side channel observation.

Figure 7:
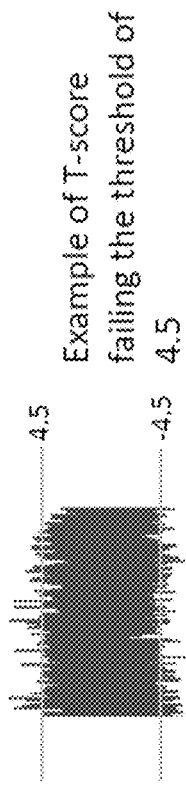
FIG. 7 illustrates T-score and simulation measurement-to-disclosure (SMTD) for assessing power side-channel leakage of tiles and full-chip electromagnetic side-channel leakage based on the placement of an RTL design according to one embodiment.
Figure 7:
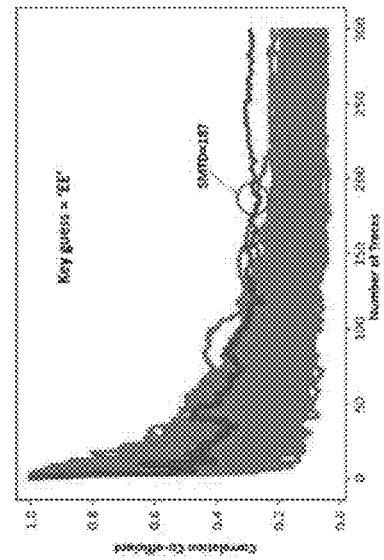

FIG. 7 illustrates T-score and SMTD for assessing power side-channel leakage of tiles and full-chip electromagnetic side-channel leakage based on the placement of an RTL design according to one embodiment. The T-score reflects the side-channel signal variation of either the per-tile power consumption or chip-level electromagnetic emission from simulation traces when the design executes security operations such as a cryptographic algorithm (e.g., security metrics calculated by operation 503 of FIG. 5). The maximum T-score (e.g., security criteria from operation 501 of FIG. 5) is set to 4.5. Because the T-score of the design exceeds the maximum T-score, the security metrics obtained based on the placement of the RTL design fail the security criteria, requiring adjustment to the placement of the security-sensitive components.

The SMTD reflects the number of side-channel traces required to disclose the secure data based on correlation analysis of either the per-tile power consumption or chip-level electromagnetic emission. FIG. 7 shows that it takes 187 simulation traces for a side-channel attacker to correctly guess the key.

Figure 8:
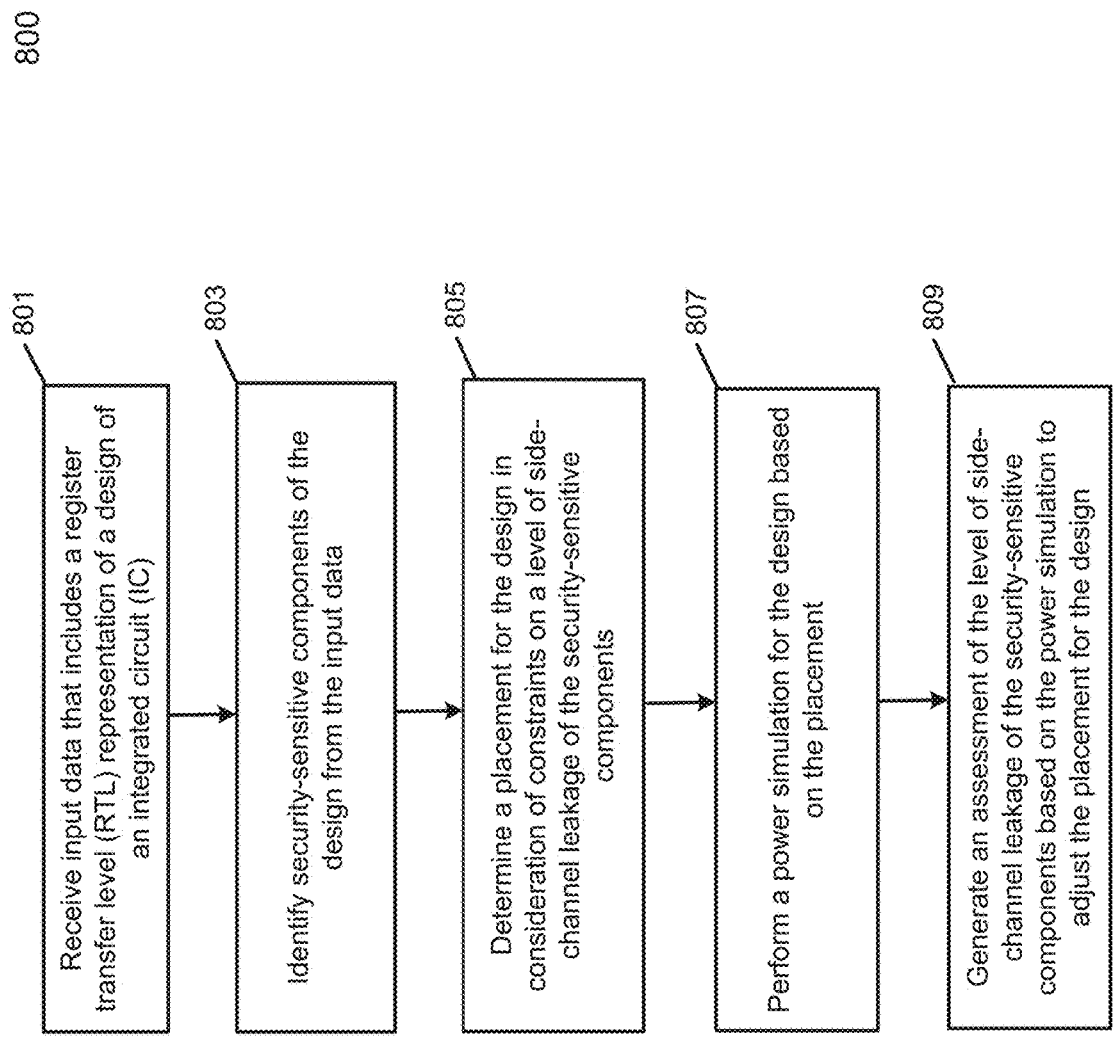
FIG. 8 is a flowchart that shows another method for assessing security vulnerability of an RTL design containing security components by performing a placement of the RTL design and performing a power simulation based on the placement to derive security metrics according to one embodiment described herein.

FIG. 8 is a flowchart that shows another method 800 for assessing security vulnerability of an RTL design containing security components by performing a placement of the RTL design and performing a power simulation based on the placement to derive security metrics according to one embodiment described herein.

In operation 801, a simulation system receives input data that includes an RTL representation of a design of an IC.

In operation 803, the simulation system identifies security-sensitive components of the design from the input data.

In operation 805, the simulation system determines a placement for the design in consideration of constraints on a level of side-channel leakage of the security-sensitive components.

In operation 807, the simulation system performs power simulation for the design based on the placement.

In operation 809, the simulation system generates an assessment of the level of side-channel leakage of the security-sensitive components based on the power simulation to adjust the placement for the design.

Figure 9:
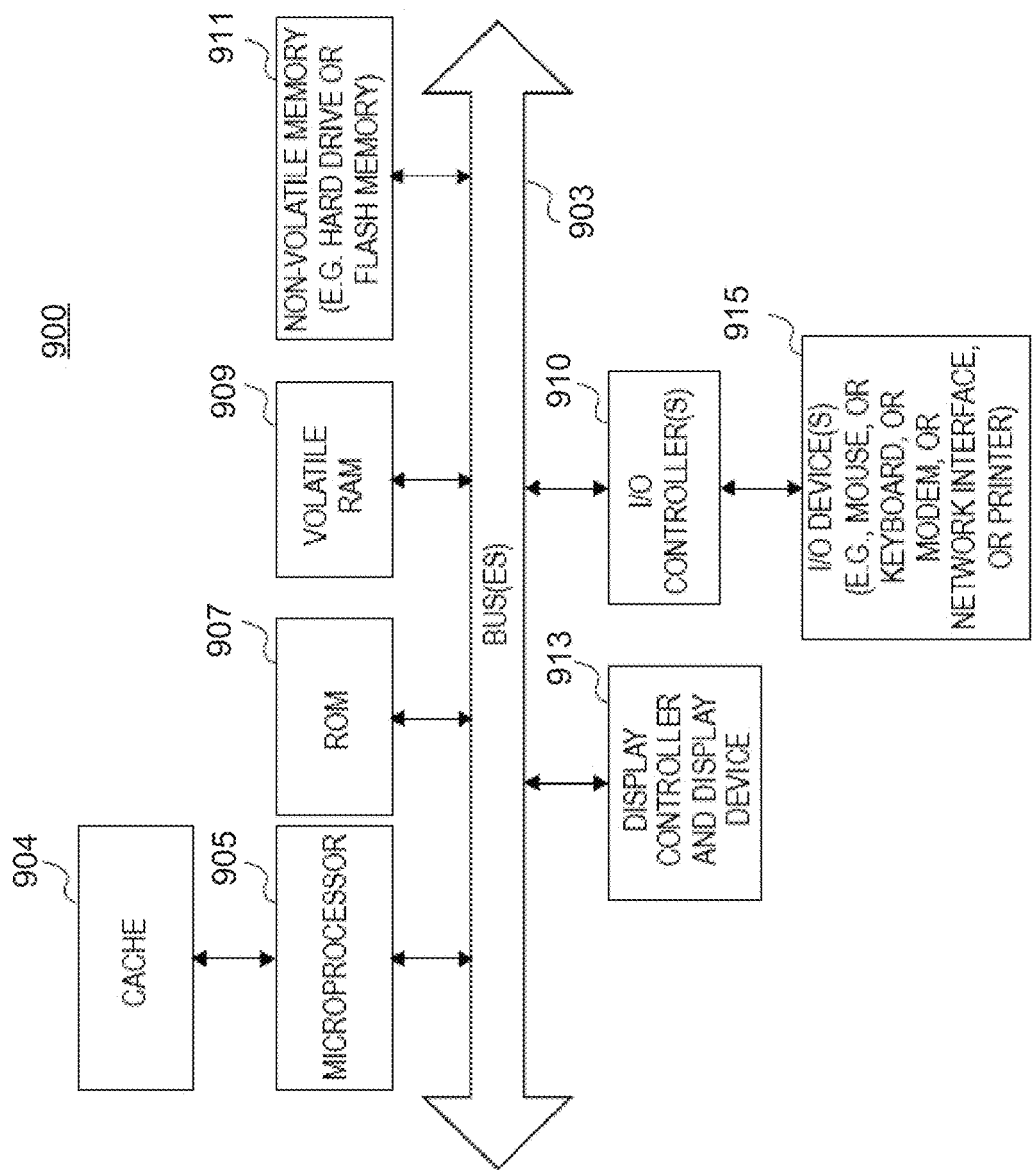
FIG. 9 shows an example of a data processing system that can be used to implement one or more embodiments described herein.

FIG. 9 shows an example of a data processing system 900 that can be used to implement one or more embodiments described herein. For example, the system 900 may be used to perform any one of the methods described herein such as the methods shown in FIGS. 1, 2, 3, 5, 6, and 8. Note that while FIG. 9 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 9, the device 900, which is a form of a data processing system, includes a bus 903 which is coupled to a microprocessor(s) 905 and a ROM (Read Only Memory) 907 and volatile RAM 909 and a non-volatile memory 911. The microprocessor(s) 905 may retrieve the instructions from the memories 907, 909, 911 and execute the instructions to perform operations described above. The microprocessor(s) 905 may contain one or more processing cores. The bus 903 interconnects these various components together and also interconnects these components 905, 907, 909, and 911 to a display controller and display device 913 and to peripheral devices such as input/output (I/O) devices 915 which may be touchscreens, mice, keyboards, modems, network interfaces, printers and other devices which are well known in the art. Typically, the input/output devices 915 are coupled to the system through input/output controllers 910. The volatile RAM (Random Access Memory) 909 is typically implemented as dynamic RAM (DRAM), which requires power continually in order to refresh or maintain the data in the memory.

The non-volatile memory 911 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 911 will also be a random access memory although this is not required. While FIG. 9 shows that the non-volatile memory 911 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine-readable medium includes any mechanism for storing information in a form readable by a machine (e.g., a computer). For example, a non-transitory machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. For example, while exemplary embodiments have been described for assessing security vulnerabilities of a RTL representation of a design, the described techniques may be applied equally to a gate level netlist or other representations or circuit abstractions of the design. Also, the security-aware placement may be an estimation methodology (e.g., a virtual placement) for security vulnerability assessment early in the design cycle or a full implementation of the placement algorithm to allow a detailed security vulnerability assessment. In addition, while the exemplary embodiments have described security vulnerabilities of a design based on side-channel leakage such as power consumption and electromagnetic emission, the security vulnerability assessment may be extended to other operating characteristics of security-sensitive components of the design such as power supply noise, thermal emission, temperature profile, etc. The security metrics used to assess the security vulnerabilities of a design may also include KL divergence data, correlation of block power to global power, SLS, etc., in addition to the described T-score and SMTD. The specification and drawings are, accordingly, to be regarded in an illustrative sense rather than a restrictive sense.

What is claimed is:

1. A computer-implemented method for assessing security vulnerabilities of an integrated circuit (IC), comprising:
   receiving input data that includes a representation of a design of the IC;
   identifying security-sensitive components of the design from the input data;
   determining a placement for the design in consideration of constraints on a level of security vulnerabilities of the security-sensitive components;
   performing a power simulation for the design based on the placement; and
   generating an assessment of the level of security vulnerabilities of the security-sensitive components based on the power simulation to adjust the placement for the design.

2. The method of claim 1, further comprising:
   determining that the assessment indicates the level of security vulnerabilities of the security-sensitive components satisfies security criteria; and
   generating a physical design for the IC based on the placement of the design.

3. The method of claim 1, wherein the security-sensitive components of the design are identified as one or more clustered groups of security-sensitive sub-components, and wherein the placement for the design is partitioned into a plurality of component groupings each including a plurality of physical cells.

4. The method of claim 3, wherein the constraints used to determine the placement comprise:
   distance constraints between the security-sensitive sub-components within a same clustered group;
   power constraints for the component groupings containing at least one security-sensitive sub-component; and
   total power constraints for the IC.

5. The method of claim 3, wherein determining the placement for the design comprises:
   identifying distance constraints including a minimum distance and a maximum distance between the security-sensitive sub-components within a clustered group; and
   determining a placement for each clustered group of the security-sensitive sub-components by placing the security-sensitive sub-components among one or more of the component groupings to satisfy the distance constraints.

6. The method of claim 5, wherein performing the power simulation for the design comprises:
identifying power constraints for the component groupings;
estimating power consumption for the one or more component groupings each containing at least one security-sensitive sub-component based on the power simulation; and
adjusting the placement for one of the clustered groups of security-sensitive sub-components to increase distances between the security-sensitive sub-components within the one clustered group up to the maximum distance while keeping the estimated power consumption for one or more component groupings containing the one clustered group of security-sensitive sub-components within the power constraints for the component groupings.

7. The method of claim 5, wherein performing the power simulation for the design comprises:
identifying total power constraints for the IC;
estimating power consumption for the plurality of component groupings each containing at least one security-sensitive sub-component based on the power simulation;
estimating power consumption for the design based on the power consumption for the plurality of component groupings; and
adjusting the placement for one or more of the clustered groups of security-sensitive sub-components to increase distances between the security-sensitive sub-components within the one or more clustered groups up to the maximum distance while keeping the estimated power consumption for the design within the total power constraints for the IC.

8. The method of claim 3, wherein determining the placement for the design comprises:
distributing the security-sensitive sub-components of each clustered group among one or more of the component groupings,
wherein generating the assessment of the level of security vulnerabilities of the security-sensitive components comprises:
estimating power consumption for a plurality of the component groupings each containing at least one security-sensitive sub-components based on the power simulation; and
estimating an electromagnetic emission for the IC at an observation location proximate to the IC.

9. The method of claim 8, wherein estimating the electromagnetic emission for the IC comprises:
modeling an electric dipole based on an estimated current flowing through power and ground layers of each of the plurality of component groupings;
estimating an electromagnetic emission at the observation location generated by each of the electric dipole from the plurality of component groupings; and
integrating the electromagnetic emission at the observation location generated by each of the electric dipole to generate the electromagnetic emission for the IC.

10. The method of claim 8, wherein generating the assessment of the level of security vulnerabilities of the security-sensitive components further comprises:
adjusting the placement for one or more of the clustered groups to reduce variations in the power consumption for the plurality of the component groupings or the electromagnetic emission for the IC.

11. The method of claim 8, wherein generating the assessment of the level of security vulnerabilities of the security-sensitive components further comprises:
adjusting the placement for one or more of the clustered groups to increase a number of simulation traces needed to reveal the security-sensitive components based on a correlation analysis of the power consumption for the plurality of the component groupings or the electromagnetic emission for the IC.

12. A non-transitory machine-readable medium storing executable program instructions which when executed by a data processing system cause the data processing system to perform a method comprising:
receiving input data that includes a representation of a design of an integrated circuit (IC);
identifying security-sensitive components of the design from the input data;
determining a placement for the design in consideration of constraints on a level of security vulnerabilities of the security-sensitive components;
performing a power simulation for the design based on the placement; and
generating an assessment of the level of security vulnerabilities of the security-sensitive components based on the power simulation to adjust the placement for the design.

13. The non-transitory machine-readable medium of claim 12, wherein the method further comprises:
determining that the assessment indicates the level of security vulnerabilities of the security-sensitive components satisfies security criteria; and
generating a physical design for the IC based on the placement of the design.

14. The non-transitory machine-readable medium of claim 12, wherein the security-sensitive components of the design are identified as one or more clustered groups of security-sensitive sub-components, and wherein the placement for the design is partitioned into a plurality of component groupings each including a plurality of physical cells.

15. The non-transitory machine-readable medium of claim 14, wherein the constraints used to determine the placement comprise:
distance constraints between the security-sensitive sub-components within a same clustered group;
power constraints for the component groupings containing at least one security-sensitive sub-component; and
total power constraints for the IC.

16. The non-transitory machine-readable medium of claim 14, wherein determining the placement for the design comprises:
identifying distance constraints including a minimum distance and a maximum distance between the security-sensitive sub-components within a clustered group; and
determining a placement for each clustered group of the security-sensitive sub-components by placing the security-sensitive sub-components among one or more of the component groupings to satisfy the distance constraints.

17. The non-transitory machine-readable medium of claim 16, wherein performing the power simulation for the design comprises:
identifying power constraints for the component groupings;

estimating power consumption for the one or more component groupings each containing at least one security-sensitive sub-component based on the power simulation; and adjusting the placement for one of the clustered groups of security-sensitive sub-components to increase distances between the security-sensitive sub-components within the one clustered group up to the maximum distance while keeping the estimated power consumption for one or more component groupings containing the one clustered group of security-sensitive sub-components within the power constraints for the component groupings.

18. The non-transitory machine-readable medium of claim 16, wherein performing the power simulation for the design comprises:

identifying total power constraints for the IC;

estimating power consumption for the plurality of component groupings each containing at least one security-sensitive sub-component based on the power simulation;

estimating power consumption for the design based on the power consumption for the plurality of component groupings; and adjusting the placement for one or more of the clustered groups of security-sensitive sub-components to increase distances between the security-sensitive sub-components within the one or more clustered groups up to the maximum distance while keeping the estimated power consumption for the design within the total power constraints for the IC.

19. The non-transitory machine-readable medium of claim 14, wherein determining the placement for the design comprises:

distributing the security-sensitive sub-components of each clustered group among one or more of the component groupings, wherein generating the assessment of the level of security vulnerabilities of the security-sensitive components comprises:

estimating power consumption for a plurality of the component groupings each containing at least one security-sensitive sub-components based on the power simulation; and estimating an electromagnetic emission for the IC at an observation location proximate to the IC.

20. The non-transitory machine-readable medium of claim 19, wherein estimating the electromagnetic emission for the IC comprises:

modeling an electric dipole based on an estimated current flowing through power and ground layers of each of the plurality of component groupings;

estimating an electromagnetic emission at the observation location generated by each of the electric dipole from the plurality of component groupings; and integrating the electromagnetic emission at the observation location generated by each of the electric dipole to generate the electromagnetic emission for the IC.

21. The non-transitory machine-readable medium of claim 19, wherein generating the assessment of the level of security vulnerabilities of the security-sensitive components further comprises:

adjusting the placement for one or more of the clustered groups to reduce variations in the power consumption for the plurality of the component groupings or the electromagnetic emission for the IC.

22. The non-transitory machine-readable medium of claim 19, wherein generating the assessment of the level of security vulnerabilities of the security-sensitive components further comprises:

adjusting the placement for one or more of the clustered groups to increase a number of simulation traces needed to reveal the security-sensitive components based on a correlation analysis of the power consumption for the plurality of the component groupings or the electromagnetic emission for the IC.

* * * * *